(12) United States Patent
Grgac et al.

(10) Patent No.: US 8,449,018 B2
(45) Date of Patent: May 28, 2013

(54) WATER ASSIST INJECTION MOULDED STRUCTURAL MEMBERS

(76) Inventors: Steven Grgac, Mississauga (CA); Hans-Joachim Ludwig, Neckartenzlingen (DE); Gerhard Fischer, Deizisau (DE); Martin McLeod, Barrie (CA)

( * ) Notice: Subject to any disclaimer, the term of this patent is extended or adjusted under 35 U.S.C. 154(b) by 847 days.

(21) Appl. No.: 12/438,997

(22) PCT Filed: Aug. 29, 2007

(86) PCT No.: PCT/CA2007/001488
§ 371 (c)(1),
(2), (4) Date: Dec. 1, 2009

(87) PCT Pub. No.: WO2008/025133
PCT Pub. Date: Mar. 6, 2008

(65) Prior Publication Data
US 2011/0316306 A1    Dec. 29, 2011

Related U.S. Application Data

(60) Provisional application No. 60/840,877, filed on Aug. 29, 2006.

(51) Int. Cl.
*B60R 13/01* (2006.01)
*B62D 25/06* (2006.01)

(52) U.S. Cl.
USPC ............ 296/187.01; 296/205; 296/1.08; 296/193.05

(58) Field of Classification Search
USPC ......... 296/203.01–203.04, 193.05, 193.06, 296/193.12, 208, 210, 146.7, 39.1, 1.08, 296/1, 87.01, 205
See application file for complete search history.

(56) References Cited

U.S. PATENT DOCUMENTS

| | | |
|---|---|---|
| 4,055,285 A | 10/1977 | Bott |
| 4,901,902 A | 2/1990 | Stapleton |
| 4,945,682 A | 8/1990 | Altman et al. |

(Continued)

FOREIGN PATENT DOCUMENTS

| | | |
|---|---|---|
| CA | 2348128 A1 | 12/2001 |
| DE | 4339879 C1 | 3/1995 |

(Continued)

OTHER PUBLICATIONS

Michaeli W et al: "Die Wit Auf Dem Weg Zur Serie Wasserinjektionstechnik Jetzt Industriell Ang Ewendet" Kunststoffe, Carl Hanser Verlg, Munchen, DE, vol. 91 No. 3, (Mar. 1, 2001), pp. 104-106, XP001039128, ISSN: 0023-5563 *p. 105, right hand column, paragraph 1: figure 1; Table 2*.

*Primary Examiner* — Glenn Dayoan
*Assistant Examiner* — Gregory Blankenship
(74) *Attorney, Agent, or Firm* — Warn Partners, P.C.

(57) ABSTRACT

A method of forming members of fiber reinforced thermoplastic members via molding, the members including at least one hollow chamber, formed by water injection into the melt in the mold, to stiffen the finished member. The thermoplastic is preferably selected from a group comprising polypropylene, Nylon, PET, ABS, TPO, and thermoplastic polyurethane, while the reinforcing fibers are preferably selected from a group comprising glass, aramid, carbon, and natural fibers. Preferably, the extruded melt is produced such that the average length of the reinforcing fibers is less than four millimeters.

9 Claims, 2 Drawing Sheets

U.S. PATENT DOCUMENTS

| | | | |
|---|---|---|---|
| 5,354,114 A * | 10/1994 | Kelman et al. | 296/192 |
| 5,819,408 A * | 10/1998 | Catlin | 29/897.2 |
| 5,855,840 A | 1/1999 | Cucheran et al. | |
| 6,073,991 A * | 6/2000 | Naert | 296/187.02 |
| 6,206,458 B1 * | 3/2001 | Schroeder et al. | 296/203.01 |
| 6,293,615 B1 * | 9/2001 | Tarahomi | 296/193.09 |
| 6,296,301 B1 | 10/2001 | Schroeder et al. | |
| 6,299,246 B1 * | 10/2001 | Tomka | 296/205 |
| 6,644,722 B2 * | 11/2003 | Cooper | 296/187.02 |
| 6,708,504 B2 | 3/2004 | Brandt et al. | |
| 7,255,818 B2 * | 8/2007 | Homann et al. | 264/40.3 |
| 7,287,797 B1 * | 10/2007 | Belloso | 296/35.1 |
| 2003/0132647 A1 * | 7/2003 | Cooper | 296/204 |
| 2004/0108753 A1 * | 6/2004 | Bruderick et al. | 296/203.02 |
| 2005/0181173 A1 * | 8/2005 | Hermann | 428/119 |
| 2007/0077379 A1 * | 4/2007 | Passera et al. | 428/35.7 |
| 2007/0085361 A1 * | 4/2007 | Hauser | 296/1.08 |
| 2010/0038929 A1 * | 2/2010 | Matsuzaki | 296/203.02 |
| 2010/0327630 A1 * | 12/2010 | Klimek et al. | 296/203.03 |

FOREIGN PATENT DOCUMENTS

| | | |
|---|---|---|
| EP | 0645282 A1 | 3/1995 |
| EP | 0805068 A2 | 11/1997 |
| EP | 0963875 A2 | 12/1999 |
| EP | 1090811 A2 | 4/2001 |
| JP | 09183166 A | 7/1997 |
| JP | 10193378 A | 7/1998 |

* cited by examiner

WATER ASSIST INJECTION MOULDED STRUCTURAL MEMBERS

CROSS-REFERENCE TO RELATED APPLICATIONS

This application claims the benefit of U.S. Provisional Application No. 60/840,877 filed Aug. 29, 2006.

FIELD OF THE INVENTION

The present invention relates to injection molded members which can be used as structural members in a vehicle body or the like. More specifically, the present invention relates to short glass fiber reinforced thermoplastic members which include hollow chambers formed via water-assist injection molding and can be used as structural members.

BACKGROUND OF THE INVENTION

Injection molding of various members used in vehicle bodies and the like is well known. Typically, members are formed from thermoplastic material via injection molding and such members can include single-walled open and/or planar members, such as interior trim pieces, roof rails, etc.

For single-walled open members or planar members which must bear larger loads, such as roof rails, etc., the thermoplastic material is often reinforced with material such as glass fibers, which are added to the thermoplastic melt from which the member is to be molded.

However, generally such single-walled open members or planar members cannot bear structural loads, even when reinforced with glass fibers in the conventional manner. If such single-walled open members or planar members are required to bear structural loads, for example to support other components attached to them or to support their own attachment to a vehicle, metal inserts to carry the loads must be formed in the molded part or separate reinforcements such as metal plate gussets must be provided.

More recently, water-assist injection molding has been developed. Water assist injection molding is similar to gas assist injection molding with water replacing most of the gas which is injected into the molten plastic shot in the mold to form one or more hollow cavities within the finished molded part. The greater pressures which can be achieved with water, compared to gas, and the fact that water is incompressible, result in much better wall thickness uniformity than can be achieved with gas assist technologies.

Accordingly, none of the known technologies for injection molding can produce, at a reasonable cost, injection molded members with load carrying capabilities permitting the finished members to be used as structural members.

SUMMARY OF THE INVENTION

It is an object of the present invention to provide a novel method of manufacturing members from fiber reinforced thermoplastic, via injection molding, which obviates or mitigates at least one disadvantage of the prior art.

According to a first aspect of the present invention, there is provided a method of molding a member capable of carrying light structural loads, comprising the steps of: (i) injecting a shot of a molten thermoplastic material into a mold, the thermoplastic material being reinforced with short length reinforcement fibers; (ii) injecting water, or a combination of water and gas into the shot of melt in the mold to form at least one hollow chamber therein, the chamber serving to stiffen the finished structural member; and (iii) draining the water from the at least one chamber while the member is still within the mold.

Preferably, the thermoplastic material is selected from a group comprising polypropylene, Nylon, PET, ABS, TPO and thermoplastic polyurethane. Also preferably, the reinforcement fibers are selected from a group of reinforcing materials comprising glass, Aramid, carbon and natural fibers. Other filler materials commonly used in plastics formulations such as talc, mica, calcium carbonate, and clay may also be utilized in addition. Also, alternative fillers may be used without departing from the scope of the invention.

The present invention provides a method of forming members of fiber reinforced thermoplastic members via molding, the members including at least one hollow chamber, formed by water injection into the melt in the mold, to stiffen the finished member.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1A:
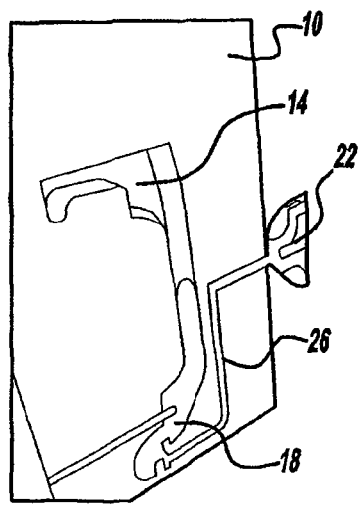
FIGS. 1a, 1b and 1c show three stages in a conventional water-assist injection molding process.
Figure 1B:
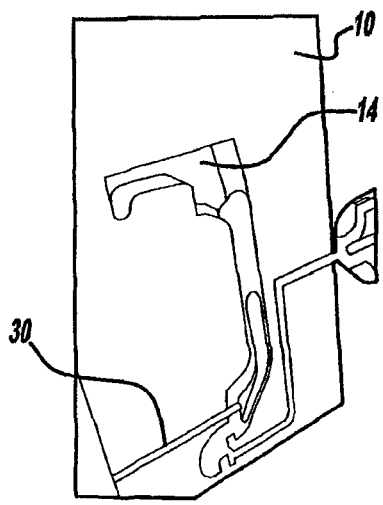
Figure 1C:
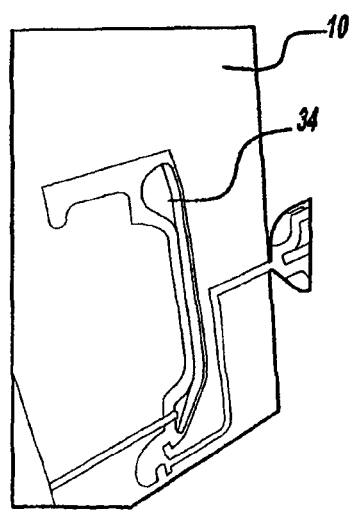

FIGS. 1a through 1c show a water-assist injection molding process in accordance with the present invention. As shown, a mold 10 includes a cavity 14 for a structural member 34 to be molded. In FIG. 1a, the cavity 14 receives a measured shot 18 of fiber reinforced thermoplastic material, or a full shot of fiber reinforced thermoplastic material. Typically the shot is received from the nozzle 22 of an extruder (not shown) through a runner or feed passage 26. Referring to FIG. 1b, water, or a combination of gas and high pressure water is injected into shot 18 via a water runner 30. The water continues to be injected into shot 18 under pressure, creating a hollow interior cavity in the structural member 34 as shown in FIG. 1c.

The mold 10 can also be used with an overfill cavity (the overfill method) or without an overfill cavity (the short shot method). Using water or a combination of gas and water provides a number of advantages over strictly gas injection. Water can provide better compression characteristics which will create smoother and more uniform walls in the hollow interior cavity. Water will also shorten production time by assisting in the cooling of the structural member 34. Other benefits to using water or a combination of gas and water include improved dimensional tolerances, and improved material properties (due to cooling of both sides of the part).

Figure 2A:
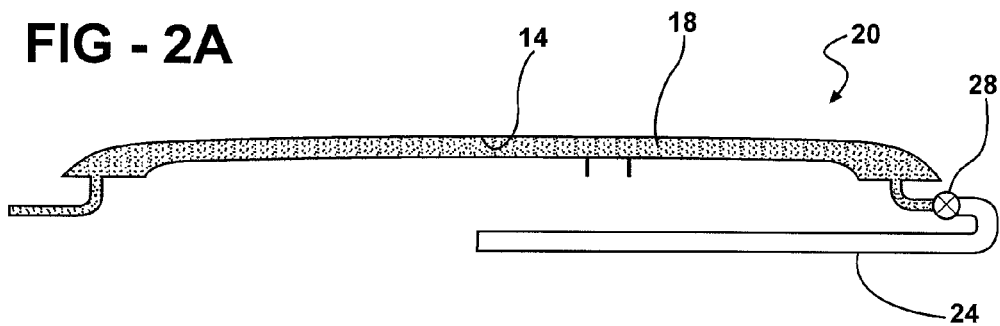
FIGS. 2a, 2b, 2c, and 2d show a roof rack manufactured in accordance with the present invention.
Figure 2B:
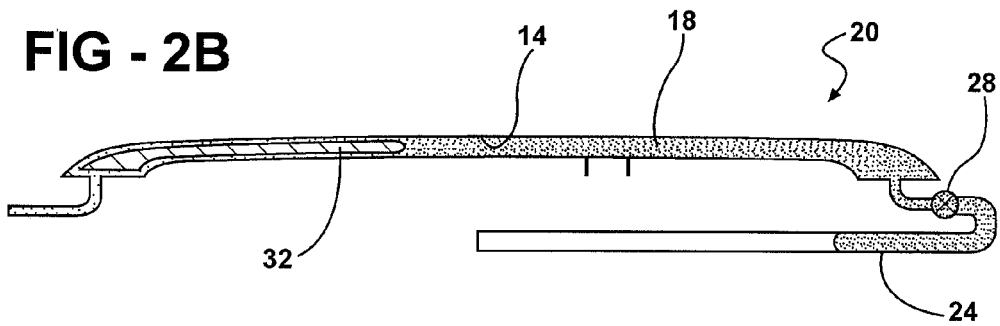
Figure 2C:
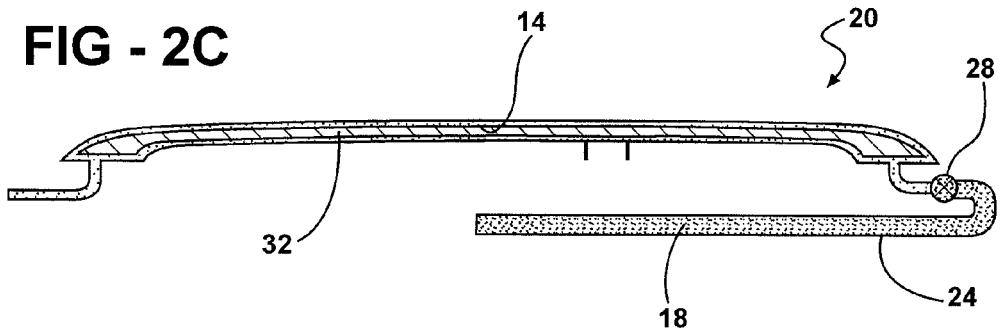
Figure 2D:
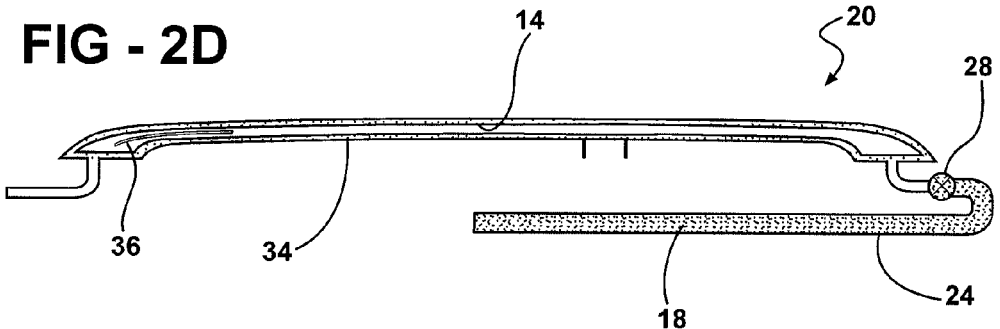

FIGS. 2a-2d show the mold of a roof rail 20 having a cavity 14 similar to what is shown in FIGS. 1a-1c. Also included are an overflow cavity 24 and a valve 28. In FIG. 2a, the cavity 14 receives the measured shot 18 of fiber reinforced thermoplastic material, or the full shot of fiber reinforced thermoplastic material with valve 28 closed. FIG. 2b shows the combination of water, or gas and water 32 that has been partially injected under pressure into the mold of the roof rail 20 with the valve 28 open. At this point during the process, a portion of the fiber reinforced thermoplastic material will begin to flow through the valve 28 into the overflow cavity 24. Once the combination of water, or gas and water 32 has fully entered the cavity 14, the roof rail 20 will be in the position shown in FIG. 2c. All the excess fiber reinforced thermoplastic material will be in the overflow cavity 24. After the combination of water or gas and water 32 has been removed, the roof rail 20 will be hollow.

The shot 18 of fiber reinforced thermoplastic material may be prepared using an inline compounder or using pre-compounded pellets. The length of the fibers in the shot 18 will be less than four millimeters, with the length preferably being less than one millimeter. Depending on the particular application the quality of melt may be more important than in other types of applications. Preferably short glass fibers are used as the reinforcement fibers. Other reinforcement fibers which can be employed with the present invention include aramid, carbon and natural fibers, such as hemp. The typical material composition of the fiber reinforced thermoplastic material will be approximately 40%; however, it is conceivable for the material composition to range from substantially 0% to 70%. The addition of the fiber material yields a fiber reinforced injection molded member capable of carrying light structural loads. In particular the modulus of flexibility of the fiber material is in the range of 500-2000 Kpsi. This property adds to the stiffness of the molded member. In addition to the fiber material the shot 18 also has thermoplastic material. Preferably, the thermoplastic material is selected from a group comprising polypropylene, Nylon, PET, ABS, TPO, and thermoplastic polyurethane. Other fiber reinforcement or filler materials such as talc, mica, calcium carbonate, and clay may also be used in the formulations of the present invention. Alternative materials may be used without departing from the scope of the invention.

After the structural member 34 is hollowed using water, or a combination of gas and water 32, a hollow chamber is formed, and the gas pressure is released (if used) and water is drained from the hollowed area of the structural member 34. Gravity, pressurized air, or a vacuum is used to drain the water from the structural part 34.

The structural member 34 that is produced from the process described above will have several unique features and can take many forms. The structural member 34 is a rigid body formed of the fiber reinforced polymeric material. As indicated above the fiber content of the rigid body will range from substantially 0% to 70%. Furthermore, the rigid body will have a modulus of flexibility ranging from 500 to 2000 kpsi. As indicated above, a hollow cavity is formed through the rigid body and as described below will serve many functions. As stated the structural member 34 will take many forms and can be used to form both interior and exterior components. Fasteners can be molded directly into the structural member for attachment purposes. The rest of this section will now focus on some of the specific embodiments of structural members that can be formed using the molding process described above.

The structural member 34 further comprising electrical wiring 36 extending through said hollow cavity.

The above-described embodiments of the invention are intended to be examples of the present invention and alterations and modifications may be effected thereto, by those of skill in the art, without departing from the scope of the invention which is defined solely by the claims appended hereto.

We claim:

1. A structural member comprising; a rigid body formed of a fiber reinforced polymeric material having a fiber content ranging from substantially zero to seventy percent, the length of said fillers being less than four millimeters, wherein said rigid body has a modulus of flexibility ranging from 500 to 2000 kpsi; and a hollow interior cavity formed through at least a portion of the inside of said rigid body.

2. The structural member of claim 1 wherein the walls of the cavity are of uniform thickness.

3. The structural member of claim 1 wherein said rigid body is an interior trim piece.

4. The structural member of claim 1 wherein said rigid body is an exterior vehicle component piece.

5. The structural member of claim 1 wherein said fiber material is selected from a group comprised of glass, Aramid, carbon, hemp, or natural fibers.

6. The structural member of claim 1 wherein said polymeric material is selected from a group comprising polypropylene, Nylon, PET, ABS, TPO and thermoplastic polyurethane.

7. The structural member of claim 1, wherein said reinforcement fibers are less than one millimeter in length.

8. The structural member of claim 1 further comprising electrical wiring extending through said hollow cavity.

9. The structural member of claim 1 wherein said hollow cavity is a heating or ventilation plenum.

* * * * *